Figure 3:
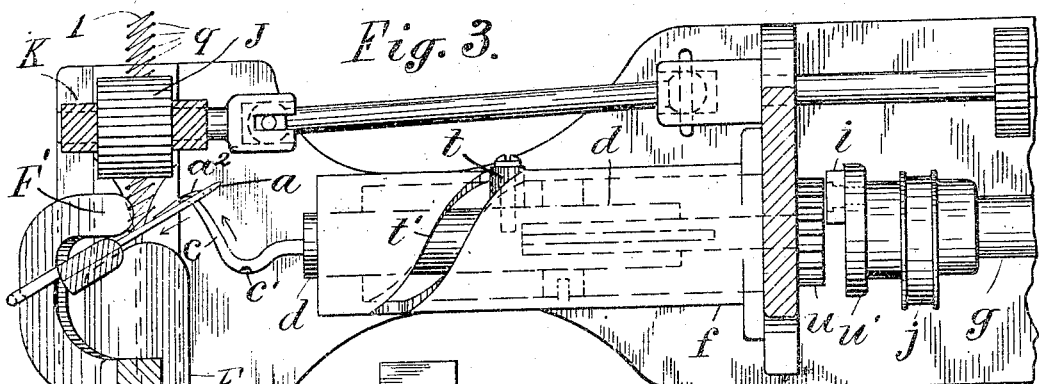
Figure 3A:
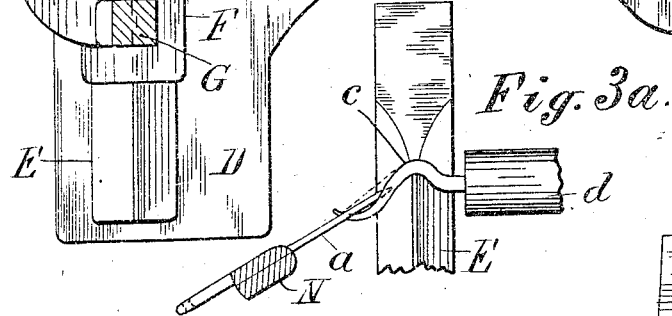

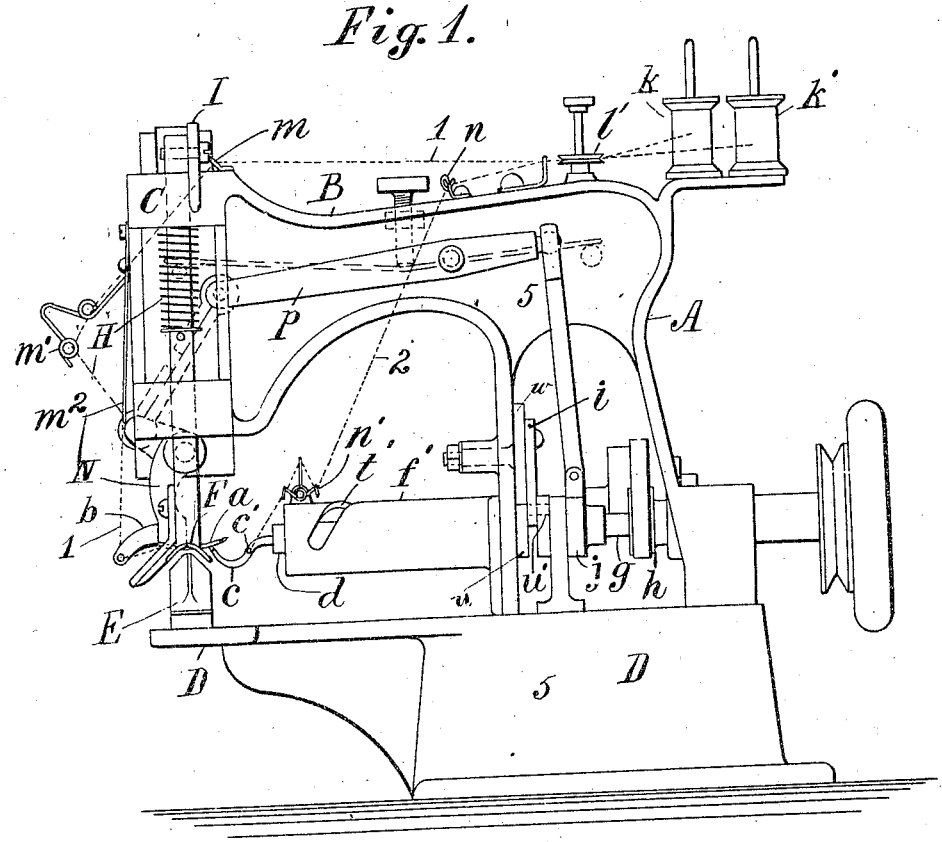
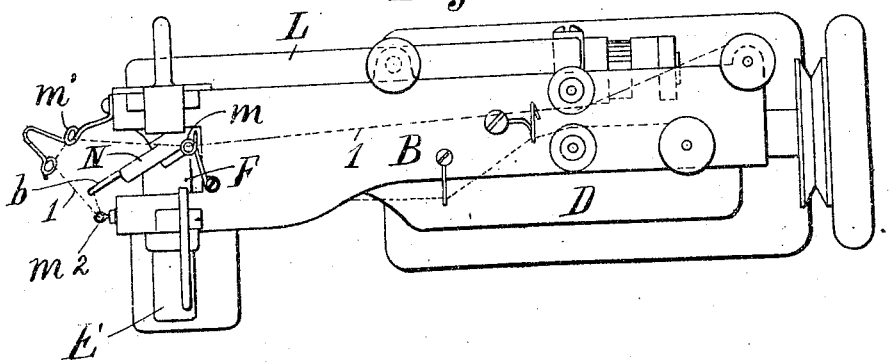

No. 862,458. PATENTED AUG. 6, 1907.
J. E. FEFEL.
BLINDSTITCH SEWING MACHINE.
APPLICATION FILED MAR. 21, 1906.

5 SHEETS—SHEET 2.

Witnesses:
L. Lee
Dawson D. Purrington.

Inventor.
John E. Fefel, per
Thomas L. Crane, Atty.

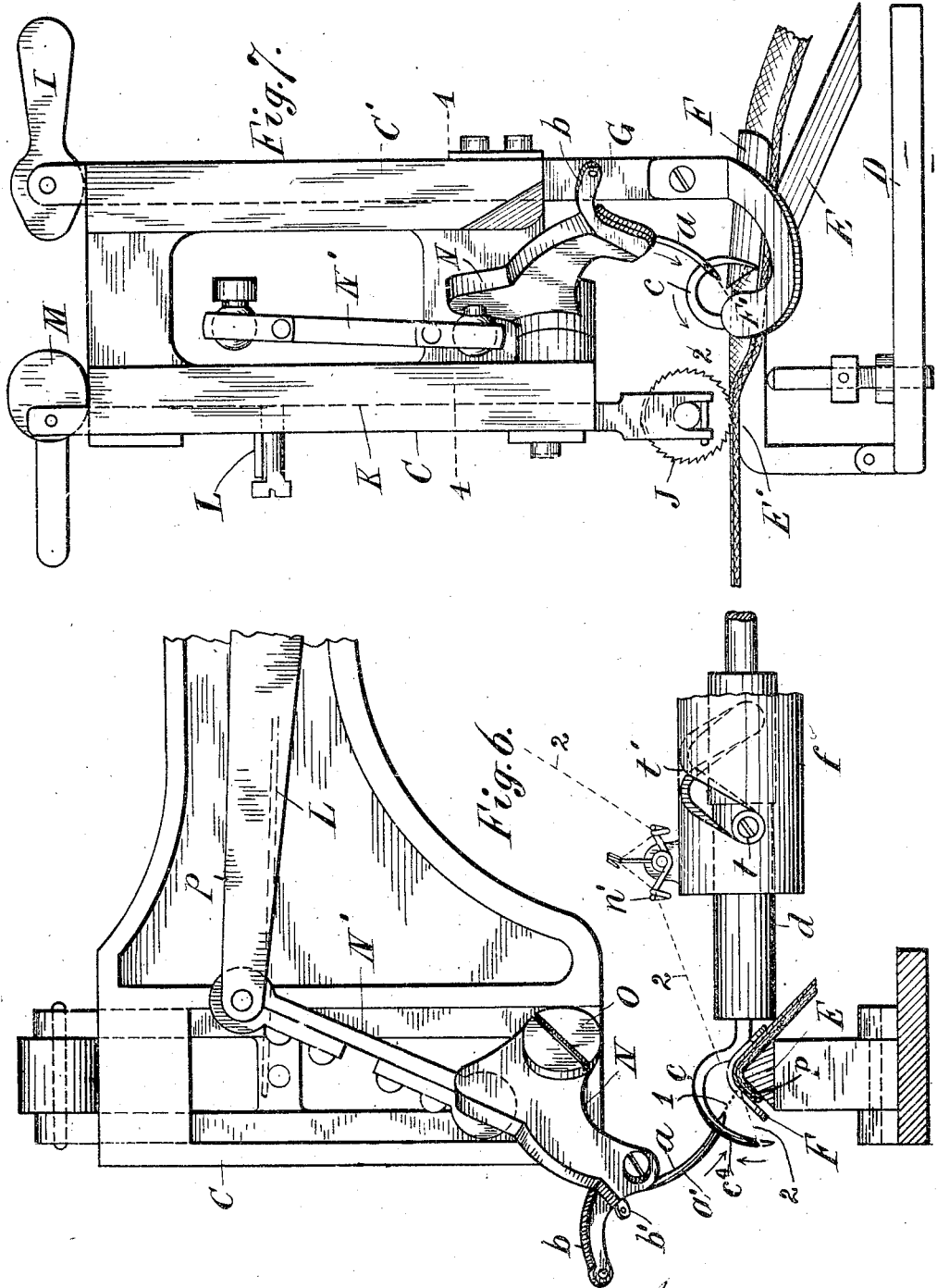

No. 862,458. PATENTED AUG. 6, 1907.
J. E. FEFEL.
BLINDSTITCH SEWING MACHINE.
APPLICATION FILED MAR. 21, 1906.
5 SHEETS—SHEET 4.
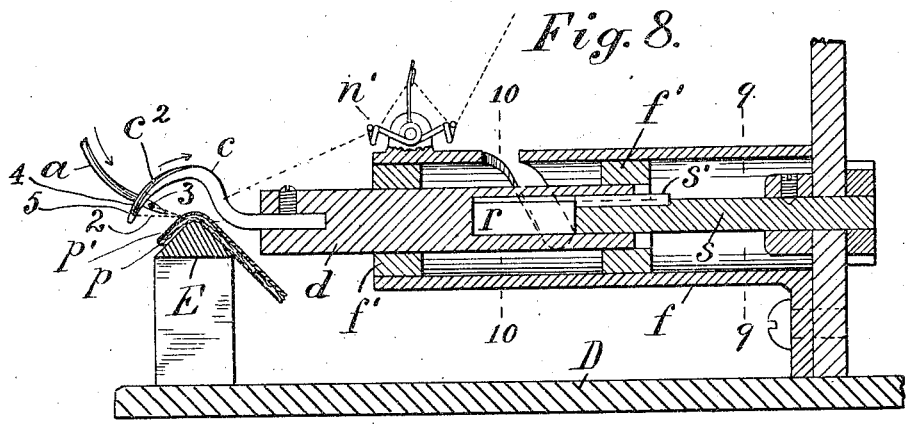
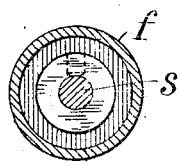
Fig. 9.
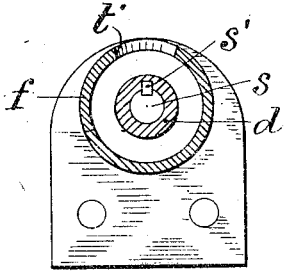
Fig. 10.
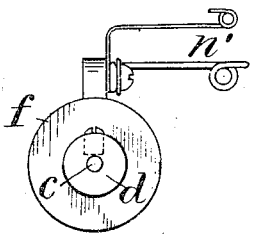
Fig. 11.
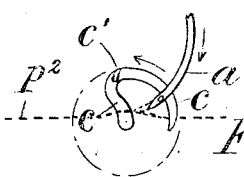
Fig. 12.
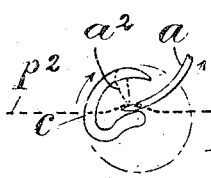
Fig. 13.
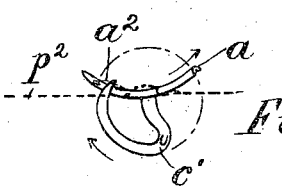
Fig. 14.
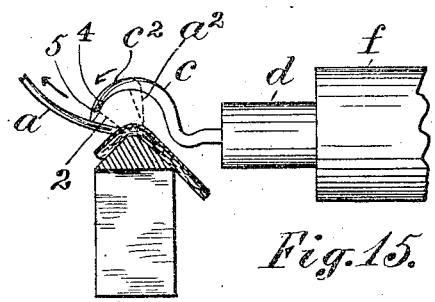
Fig. 15.
Witnesses:
L. Lee.
Davion D. Purrington.
Inventor.
John E. Fefel, per
Thomas S. Crane, Atty.

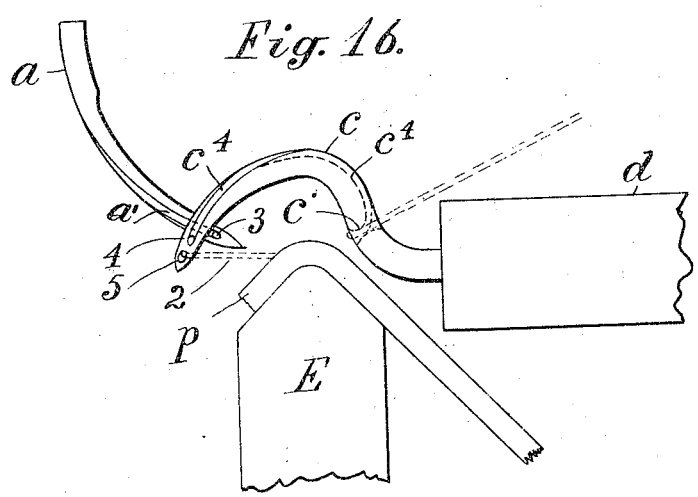
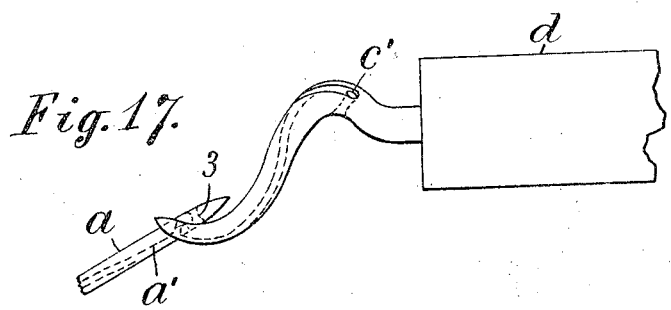

UNITED STATES PATENT OFFICE.

JOHN E. FEFEL, OF PHILADELPHIA, PENNSYLVANIA, ASSIGNOR TO UNITED STATES FELLING MACHINE COMPANY, A CORPORATION OF NEW YORK.

BLINDSTITCH SEWING-MACHINE.

No. 862,458.

Specification of Letters Patent.

Patented Aug. 6, 1907.

Application filed March 21, 1906. Serial No. 307,191.

*To all whom it may concern:*

Be it known that I, JOHN E. FEFEL, a citizen of the United States, residing at 240 South Ninth street, Philadelphia, county of Philadelphia, and State of Pennsylvania, have invented certain new and useful Improvements in Blindstitch Sewing-Machines, fully described and represented in the following specification and the accompanying drawings, forming a part of the same.

The object of this invention is to furnish a blindstitch sewing-machine having a needle operated through a ridge upon the fabric, with a spiral looper carrying a looper-thread to loop with the needle-thread. To effect this object, I provide a sewing machine feed-table with a longitudinal ridge over which the cloth advances longitudinally during the sewing operation, with the curved needle operating in a vertical plane obliquely across the ridge, and a spiral looper with a very open spiral, having a horizontal axis substantially level with the top of the ridge and arranged at right angles thereto, the angle of the looper spiral to its own axis being a little greater than the angle of the needle to the same axis, so that the point of the looper may pass the needle at opposite sides when it is moved spirally back and forth across the ridge. Heretofore, a looper has been used in conjunction with a curved needle, to perform blind stitching, by setting the axis of the looper nearly vertical, which necessitates a very flat spiral for the looper, revolving so close to the needle as to prevent the passage of any thick layers of cloth or fabric between the looper and the needle. By setting the axis of my looper horizontally, I am enabled to make the looper with an open spiral of very coarse pitch, so that it arches over the ridge which supports the cloth, and permits cloth of any thickness to be fed along between the top of the needle and the under side of the looper. In such construction, the looper is preferably formed with an eye near the base and an eye near the point, and the needle is formed with an eye opening upon the side; and the spiral looper is not only rotated, but advanced to move in a spiral path which first engages the point of the looper with a loop of the needle-thread on one side of the needle at the nearer side of the ridge while the needle is in the cloth, and then carries the point of the looper forward across the path of the needle upon the opposite side of the ridge, so that the needle when taking a fresh stitch may pass between the looper and a strand of the looper-thread stretched from the cloth to the eye in the point of the looper. In taking each stitch, the looper engages a loop of the needle-thread during the backward movement of the needle, and the needle engages a loop of the looper-thread in the forward movement of the needle.

The needle is mounted upon an oscillating carrier pivoted over the center of the ridge and is reciprocated across the ridge obliquely, and at a suitable angle to pass upon opposite sides of the looper-point in its forward and backward motions.

As the needle is formed with an eye opening upon the side, a spiral groove upon the needle is necessary to carry the thread to the outer side of the needle; where it may receive the thread from a suitable guide upon the carrier. The eye near the base of the looper is extended from the inner to the outer side of the spiral, and a groove is extended along the outer side of the spiral from such eye to the eye upon the point.

A double eye is preferably employed in the point of the looper, with a rounded bridge or partition between such eyes, and the thread may thus be led from the groove upon the outer side of the looper inwardly and then outwardly again, which throws it more nearly in the path of the needle when the latter is engaging the looper-thread.

The invention will be understood by reference to the annexed drawing, in which

Figure 4:
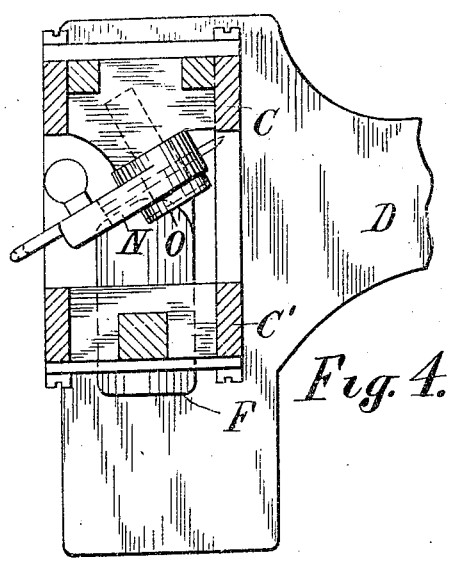
Figure 5:
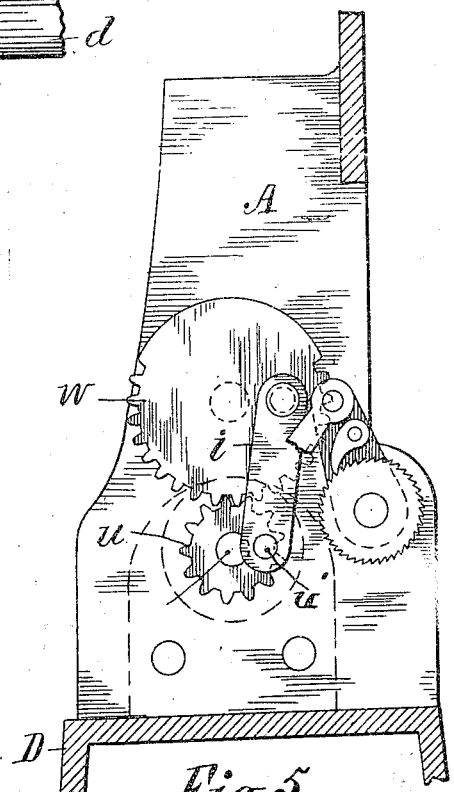

Figure 1 is a side elevation of a machine provided with the improvements; Fig. 2 is a plan of the same; Fig. 3 is a plan of the stitching devices with the parts removed above the shank of the needle; Fig. 3ª is a plan of the looper, the ridge E, the needle and its carrier N cut off just above its junction with the needle. Fig. 4 is a section on line 4—4 in Fig. 7; Fig. 5 is a vertical section of the post of the machine in line 5—5 in Fig. 1, showing the gearing for operating the feed, the needle and the looper; Fig. 6 is a side elevation, and Fig. 7 a front elevation of the needle-carrying and looper-carrying devices. Fig. 8 is a side elevation of the looper-operating devices with the parts, where hatched, in section at the axis of the looper; Fig. 9 is a cross section on line 9—9 in Fig. 8; Fig. 10 is a cross section on line 10—10 in Fig. 8; Fig. 11 is an end view of the looper-spindle and guide; and Figs. 12, 13, 14 and 15 are diagrams showing different positions of the looper and needle. Fig. 16 is an elevation upon an enlarged scale of the needle and looper, as shown in Fig. 8; and Fig. 17 is a plan of the needle and looper in the same position. These parts are enlarged beyond their natural size, to show the eyes and grooves which guide the thread upon the needle and looper.

The frame of the machine is shown with post A, gooseneck B, head C, C', and bed D. A seat or ridge E for the cloth to be sewed is extended under the head transverse to the goose-neck, and a foot F, F' is pressed toward the same at both sides of the needle a, by a bar G mounted upon the head and provided with spring of and the usual lifter I. The seat is sloped upward where the cloth is applied to it, and ridged uniformly past the point where the needle intersects the cloth, but beyond such point it is formed with a flat surface E' to which a feed-wheel J is applied to draw the cloth forwardly. The feed-wheel is mounted in the lower end of a vertical slide K and pressed downward by a spring L, the slide having the usual lifter N to raise the feed-wheel when necessary.

The looper $c$ is mounted upon a spindle $d$ which is carried in a tubular guide $f$ extended from the post A transverse to the ridge E. A main shaft $g$ is supported in the post and provided with eccentric $h$ to operate the feed, a crank-pin $u'$ reciprocating a link $i$ to oscillate the looper, and an eccentric $j$ to oscillate the needle-carrier.

The head is formed with open-sides C, C', and an interspace in which an oscillating carrier N is pivoted upon a stud O, and carries the needle $a$ and thread-guides $b$, $b'$, the latter delivering the thread into a groove $a'$ upon the outer side of the needle. The carrier N is oscillated by a link N', lever P and connections to the eccentric $j$. Spools $k$, $k'$, and tension-wheels $l$, $l'$, are shown for the needle-thread and looper-thread respectively, thread-guides $m$, $m'$ and $m^2$ delivering the needle-thread to the guide $b$, upon the needle-carrier, and guides $n$ and $n'$ delivering the looper-thread 2 to the eye $c'$ in the base of the looper.

A piece of cloth $p$ is shown bent across the ridge E and having a facing $p'$ upon its upper side to be sewed thereto, and the needle penetrates the cloth at opposite sides of the ridge and lays the stitches on top of the same, between the points where the needle enters and emerges. Such points are indicated by dots $q$ in Fig. 3, with the needle-thread 1 extended between such dots, the cloth being omitted to avoid obscuring the mechanism.

Figs. 3, and 8 to 11 inclusive show the means for supporting the looper and moving it forward when it is rotated. The tubular looper-guide $f$ is formed with bearings $f'$ inside of the same to support the looper-spindle $d$, having a cylindrical socket $r$ in its rear end, within which a looper driving-shaft $s$ is extended and fitted thereto by a feather $s'$; to rotate the spindle while permitting a sliding movement. The sliding movement of the spindle is effected by a roller $t$ projected radially from the spindle and fitted to a spiral groove $t'$ in the looper-guide $f$. The groove $t'$ is of the same spiral form as the looper, and the rotation of the spindle thus advances the looper in a spiral path. When in operation, the looper rotates a little more than 180 degrees, and the slot $t$ is therefore of such length.

The oscillation of the looper-driving-shaft $s$ is effected as shown in Figs. 1 and 5, by a toothed pinion $u$ attached to the shaft $s$, and a gear segment $w$ pivoted to mesh with the same, and oscillated by a link $i$ which is driven by a crank-pin $g'$ upon the main shaft $g$. The motion of the link oscillates the toothed segment $w$ a little over 90 degrees, and such segment is shown with twice the radius of the pinion $u$, and the segment thus oscillates the shaft $s$ through the required arc, once for each rotation of the main shaft $g$.

The axis of the looper is upon nearly the same level as the top of the ridge E which supports the cloth, and the looper is adjusted so that its point engages a loop of the needle-thread at the inner side of the ridge as shown in Figs. 1, 3 and 14, when the point is rising, and such rising movement, conjoined with the advancing movement of the looper, carries the looper over the top of the ridge, as shown in Figs. 6 and 8,
and across the path of the needle to the outer side of the ridge, as shown in Figs. 7 and 8. The disposition of the looper-axis at the level of the ridge causes the spiral looper, owing to its coarse pitch, to move across the ridge at a considerable distance above the top of the ridge, as is clearly shown in Figs. 15 and 16, thus permitting any desired thickness of material to be supported upon the ridge and its layers penetrated to any desired depth by the needle. The clearance of the ridge by the looper is thus attained, while the point of the looper is enabled, by its rotary movement, to cross the path of the needle at opposite sides of the ridge near the level of the ridge itself, so as to form the stitch in conjunction with the needle-thread.

The clearance of the ridge by the looper point as it moves in an arched path over the ridge, is entirely different from the rotation of a looper above the ridge upon a nearly vertical axis, as has been used in other blind stitching machines; because the point of the looper is compelled in such other machines to move close to the ridge so as to engage the thread upon the needle, and its rotation does not lift it above the ridge, as in my arrangement, where the looper has a horizontal axis.

The eye of the needle opening upon the side, as at 3 in Figs. 8 and 16, is connected by a spiral groove $a'$ with the outer side of the needle at its shank, so that the thread may be delivered from the guide $b'$ into such groove.

The point of the looper is shown in Figs. 8, 15, 16 and 17 formed with eyes 4 and 5, the latter being nearest the point; and in Figs. 1, 12, 14, 16 and 17 with an eye $c'$ near the shank of the looper, which extends from the inner side of the same into a groove $c^4$ upon the outer side of the looper, which groove extends to the eyes near the point to carry the thread thereto, as shown in Figs. 12, 14, 16 and 17. When the looper-thread is thus carried upon the outer side of the looper, it is passed through one of the eyes to the interior of the hook and then outwardly through the eye next the point; which thus serves to hold the looper-thread away from the inner side of the hook, when it is rubbing against the side of the needle to engage the loop of needle-thread, as shown in Figs. 3 and 14.

The looper-thread must be led to the point of the looper and the needle-thread to the point of the needle, through a groove upon the outer side; to prevent these threads from stretching across the arch of the hook or curved needle which would interfere with the formation of the stitches; as a thread stretched across the arch is only desired in connection with the looper when the needle is engaging or forming a loop of the looper-thread, as shown in Figs. 7 and 12. In Figs. 12 to 14, the cloth is represented by a dotted line $p^2$.

With the construction described, the operation of stitching is as follows: The cloth to be sewed is extended under the foot F and feed-wheel J, and when the movement of the needle carries the needle through the fabric, as in the position shown in Fig. 3, the first retraction of the needle forms a loop $a^2$ of the needle-thread upon the side of the needle, immediately above the point of the looper, which is shown in Figs. 3 and 14 engaging such loop. The loop $a^2$ rests upon the looper, as shown in Figs. 13 and 15, while the needle and looper are carried to their extreme outward position, with the needle retracted from the cloth as shown in Figs. 6 and 7. This movement carries the looper spirally across the ridge E and to the opposite side of the needle as shown in Figs. 6, 7 and 8, which is due to the fact that the spiral of the looper forms a little more acute angle with the ridge E than that formed by the needle. This difference in the angles of the looper and the needle, in their relation to the ridge, is clearly shown in Fig. 3.
The needle and looper are shown near their extreme inward position in Figs. 3 and 14, in which the looper is engaging a loop of the needle-thread. In Fig. 13, the needle is shown partially retracted from the cloth and the loop $a^2$ supported upon the looper.
In Fig. 15, the needle is shown drawn almost clear of the cloth, the loop $a^2$ drawing further back upon the looper, and a portion of the looper-thread extended from the eye of the looper to the cloth. In Figs. 6 and 7, the looper and needle are shown in their extreme outward position just before the needle engages a loop of the looper-thread 2; and in Figs. 8 and 12, the looper is shown partially retracted and the needle somewhat advanced into the loop of the looper-thread.

With the looper in its outer position as shown in Fig. 6, the looper-thread 2 is stretched from the eye 5 of the looper to the cloth $p'$, and the forward movement of the needle carries it between such thread and the hook of the looper, so that the needle engages a loop of the looper-thread as the looper is retracted. The looper and the needle thus alternately engage loops of the opposite thread, and form a chain-stitch of zigzag appearance as shown in Fig. 3, the inclination of the needle-threads upon the surface of the fabric being due to the inclination of the needle, which is desirable to make it intersect the spiral path of the looper at opposite sides of the same.

It will be noticed in Figs. 3 and 7, that the presser-foot is of composite character, as it consists of an arched shoe F which presses upon the fabric before it reaches the path of the needle, and a supplemental finger F' which presses upon the cloth after it is sewed, so that it is held firmly against the ridge E at both sides of the needle-holes. The end of the shoe F is inclined or sloped parallel with the path of the needle, as indicated by the dotted line under the needle-carrier in Fig. 3, which permits the shoe to rest upon the cloth close to the point where it is stitched, and to clear the needle and the spiral end of the looper, when lifted.

From the above description it will be seen that my particular arrangement of the looper axis permits thick layers of cloth to be supported and stitched together upon the ridge, or thick seams or folds to be passed beneath the looper without any hindrance, which cannot be effected if the looper axis be vertical or nearly vertical, which necessitates a very flat spiral form for the looper and a movement close to the support and to the path of the needle, so that the point of the looper may engage the needle-thread.

Having thus set forth the nature of the invention what is claimed herein is:

1. In a sewing machine, the combination, with a spiral looper carrying a looper-thread and rotated spirally upon a horizontal axis, of a curved needle oscillated in a vertical plane and traversed at a slight angle across the spiral path of the looper wholly at one side of the cloth, whereby the point of the looper is carried from one side of the needle to the other in forming respectively the loops of the needle-thread and looper-thread.

2. In a sewing machine, the combination, with a ridge for supporting the cloth, means for feeding the cloth above the surface of the ridge, and a curved needle reciprocated in a vertical plane transversely to the ridge wholly at one side of the cloth, of a spiral looper rotated upon a horizontal axis and having a spiral movement over the ridge and passing at opposite sides of the needle upon opposite sides of the ridge.

3. In a sewing machine, the combination, with a ridge for supporting the cloth, and a curved needle reciprocated in a vertical plane diagonally across the ridge wholly at one side of the cloth, of a spiral looper having a horizontal axis transverse to the ridge, and a spiral movement over the ridge with its point moved spirally upon opposite sides of the needle at opposite sides of the ridge.

4. In a sewing machine, the combination, with the ridge supporting the cloth and a needle reciprocated diagonally across the ridge, of a spiral looper having its point moved spirally over the ridge to clear the same adjacent to opposite sides of the needle, and a yielding foot sloped at the front corner to clear the needle and the spiral end of the hook when the foot is lifted.

5. In a sewing machine, the combination, with a horizontal ridge for supporting the cloth, of a spiral looper having horizontal axis at right angles to the ridge and rotated spirally across the ridge, and having its point carried first upwardly and then downwardly in crossing the ridge, and the curved needle moved in a vertical plane wholly at one side of the cloth and diagonally across the ridge at opposite sides of the looper's point upon opposite sides of the ridge, and having an eye opening at the side to form a loop in the path of the looper point as the needle is retracted through the cloth.

In testimony whereof I have hereunto set my hand in the presence of two subscribing witnesses.

JOHN E. FEFEL.

Witnesses:
L. LEE,
THOMAS S. CRANE.